United States Patent
Lin et al.

(10) Patent No.: US 9,831,792 B1
(45) Date of Patent: Nov. 28, 2017

(54) BUCK-BOOST POWER CONVERSION CIRCUIT

(71) Applicant: SEA SONIC ELECTRONICS CO., LTD., Taipei (TW)

(72) Inventors: Pao-Tsun Lin, Taipei, TN (US); Ten-Chun Chen, Taipei (TW)

(73) Assignee: Sea Sonic Electronics Co., Ltd., Taipei (TW)

( * ) Notice: Subject to any disclaimer, the term of this patent is extended or adjusted under 35 U.S.C. 154(b) by 0 days.

(21) Appl. No.: 15/350,469

(22) Filed: Nov. 14, 2016

(51) Int. Cl.
  *H02M 3/337* (2006.01)
  *H02M 1/088* (2006.01)
  *H02M 1/00* (2006.01)

(52) U.S. Cl.
  CPC ......... *H02M 3/3378* (2013.01); *H02M 1/088* (2013.01); *H02M 2001/0009* (2013.01)

(58) Field of Classification Search
  CPC ............... H02M 3/3378; H02M 1/088; H02M 2001/009
  See application file for complete search history.

(56) References Cited

U.S. PATENT DOCUMENTS

| 9,401,653 | B2 * | 7/2016 | Soares ............. H02M 3/33569 |
| 2016/0036326 | A1 | 2/2016 | Sreenivas | |

* cited by examiner

*Primary Examiner* — Emily P Pham
(74) *Attorney, Agent, or Firm* — Muncy, Geissler, Olds & Lowe, P.C.

(57) ABSTRACT

A buck-boost power conversion circuit comprises a first active switch, a second active switch, an inductor, a center-tapped current transformation element, and a signal rectification unit. The first active switch is cascaded to the second active switch, which is connected in parallel with a power source. The inductor is connected with a capacitor. The center-tapped current transformation element includes a primary winding and a secondary winding. The primary winding are connected with the first and second active switches. The primary winding includes a tapped terminal connected with the inductor. While the first or second active switch is turned on, the primary winding supplies power to the inductor through the tapped terminal, and the secondary winding is induced magnetically to generate a magnetic induction signal. The signal rectification unit is connected with the secondary winding, receiving and rectifying the magnetic induction signal to generate a current sensation signal.

9 Claims, 6 Drawing Sheets

US 9,831,792 B1

BUCK-BOOST POWER CONVERSION CIRCUIT

FIELD OF THE INVENTION

The present invention relates to a buck-boost power conversion circuit, particularly to a buck-boost power conversion circuit with a center-tapped current transformation element.

BACKGROUND OF THE INVENTION

With the development of electronic industry, many circuits demand control stability in addition to the original function. Refer to FIG. 1 for an example. In order to verify the current of an inductor 301 in a buck-boost power conversion circuit 300, the current industry uses a Hall element 302 to undertake measurement, wherein the Hall element 302 is cascaded to the inductor 301 to acquire the inductor current. However, the Hall element 302 is usually bulky, occupying more layout space and unfavorable to miniaturization of the electronic devices. Besides, the Hall element 302 is more expensive and will raise the overall cost of the circuit.

A US patent No. 2016/0036326 disclosed a power supply control circuit, which comprises an emulator circuit. The emulator circuit includes a first input terminal and a second input terminal. The first input terminal receives a first input value. The first input value indicates the magnitude of an input voltage used by a power supply circuit, whereby to generate an output voltage for loads. The second input terminal receives a second input value. The second input value indicates the magnitude of an output voltage generated by the power supply circuit. In the prior art, the emulator circuit uses the input voltage and the output voltage to simulate an inductor current flowing through the power supply circuit. Although the prior art can acquire the value of the inductor current, the circuit thereof is very complicated and unfavorable for application.

SUMMARY OF THE INVENTION

One objective of the present invention is to solve the problems occurring in the conventional technology.

To achieve the abovementioned objective, the present invention provides a buck-boost power conversion circuit, which is connected with a power source and receives the electric power supplied by the power source. The buck-boost power conversion circuit comprises a first active switch, a second active switch, an inductor, a center-tapped current transformation element, and a signal rectification unit. The first active switch is cascaded to the second active switch to form a branch circuit. The branch circuit is connected in parallel with the power source. The inductor is connected with a capacitor. The center-tapped transformation element includes a primary winding and a secondary winding. Two terminals of the primary winding are respectively connected with the first active switch and the second active switch. The primary winding includes a tapped terminal connected with the inductor. While the first active switch or the second active switch is turned on, the primary winding supplies power to the inductor through the tapped terminal. Simultaneously, the secondary winding is induced to generate a magnetic induction signal. The signal rectification unit is connected with the secondary winding, receiving the magnetic induction signal and rectifying the magnetic induction signal to generate a current sensation signal corresponding to the current of the inductor.

In one embodiment, the center-tapped current transformation element includes a first sub-winding connected with the first active source and the tapped terminal; and a second sub-winding connected with the second active switch and the tapped terminal.

In one embodiment, the signal rectification unit includes a conversion resistor connected with the second winding in parallel and a rectification circuit connected with the conversion resistor in parallel.

In one embodiment, the rectification circuit is a full-wave rectification circuit or a half-wave rectification circuit.

In one embodiment, the signal rectification unit includes a voltage regulation unit connected with the rectification circuit in parallel.

In one embodiment, the buck-boost power conversion circuit further comprises an on-off control unit connected with the first active switch and the second active switch.

In one embodiment, the second active switch is a transistor, a metal-oxide-semiconductor field-effect transistor, or an insulated gate bipolar transistor.

In comparison with the conventional technology, the present invention has the following characteristics: no matter whether the first active switch or the second active switch is turned on, the present invention can generate the magnetic induction signal through the center-tapped current transformation element; the present invention rectifies the magnetic induction signal to acquire a current sensation signal corresponding to the current of the inductor, whereby the engineers can learn the variation of the current of the inductor through the current sensation signal; the present invention can solve the problems of the conventional elements: bulkiness, high price, and complicated circuit.

DETAILED DESCRIPTION OF THE PREFERRED EMBODIMENTS

The technical contents of the present invention will be described in detail in cooperation with drawings below.

Figure 1:
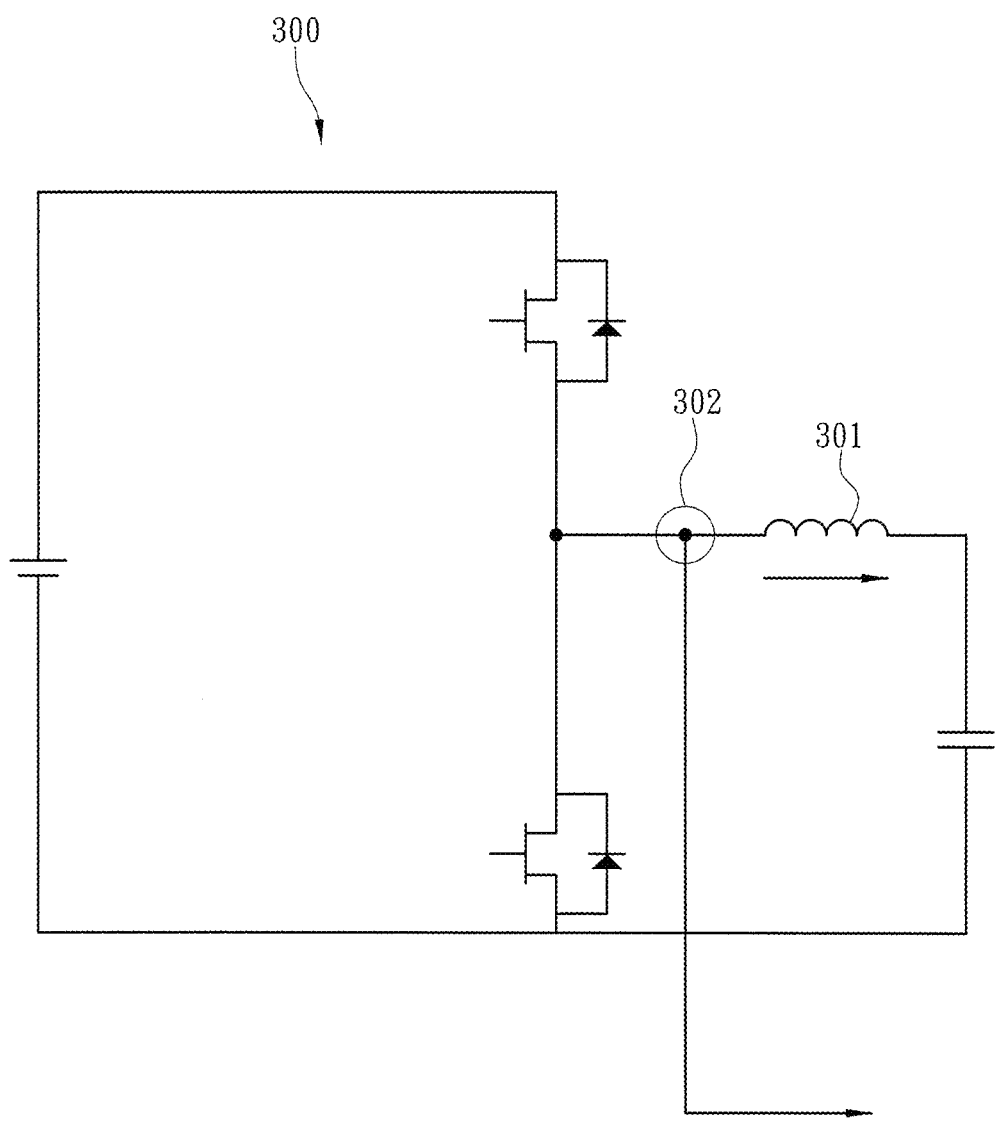
FIG. 1 is a diagram schematically showing a conventional circuit.
Figure 2:
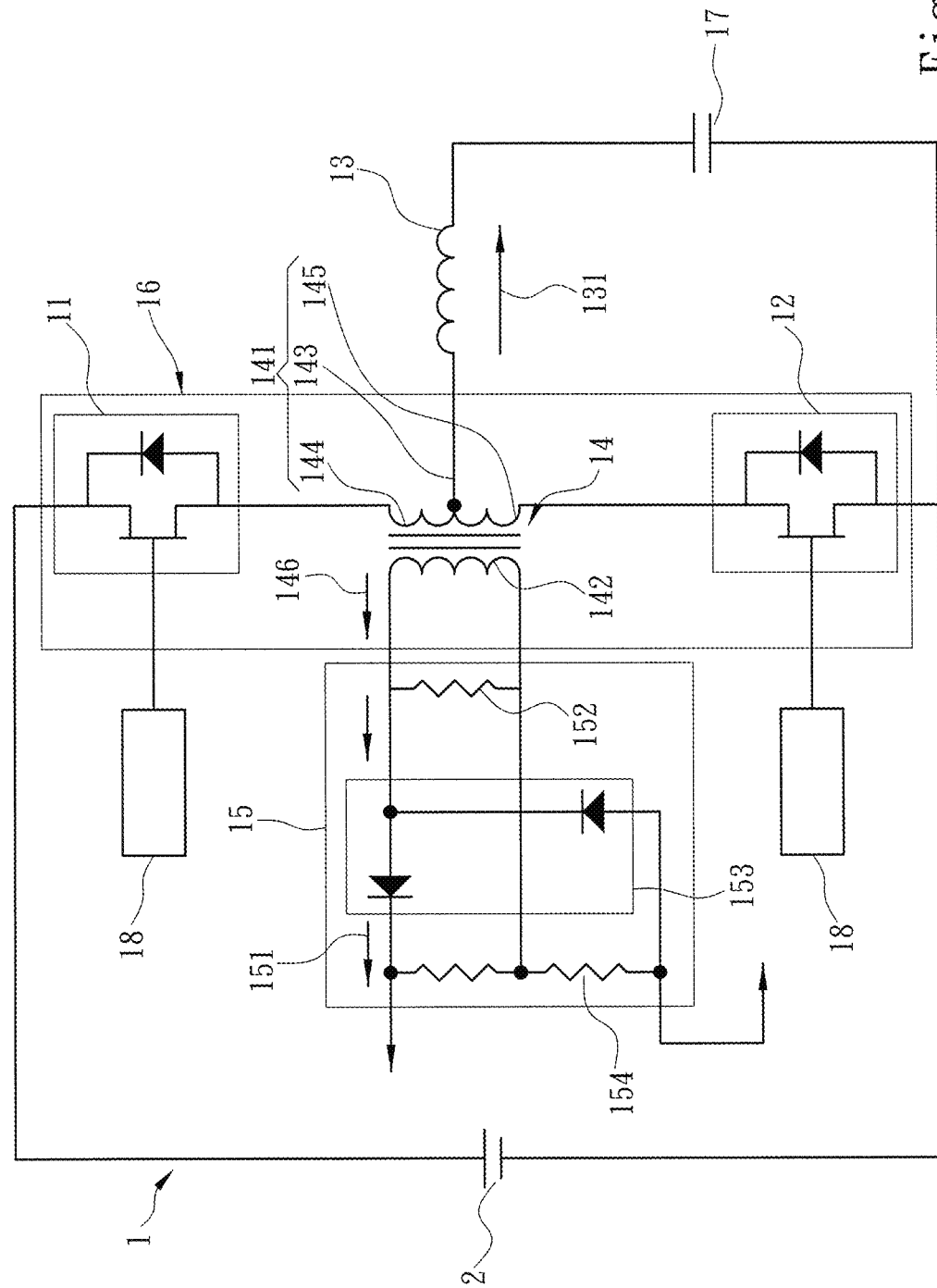
FIG. 2 is a diagram schematically showing a buck-boost power conversion circuit according to one embodiment of the present invention.
Figure 3:
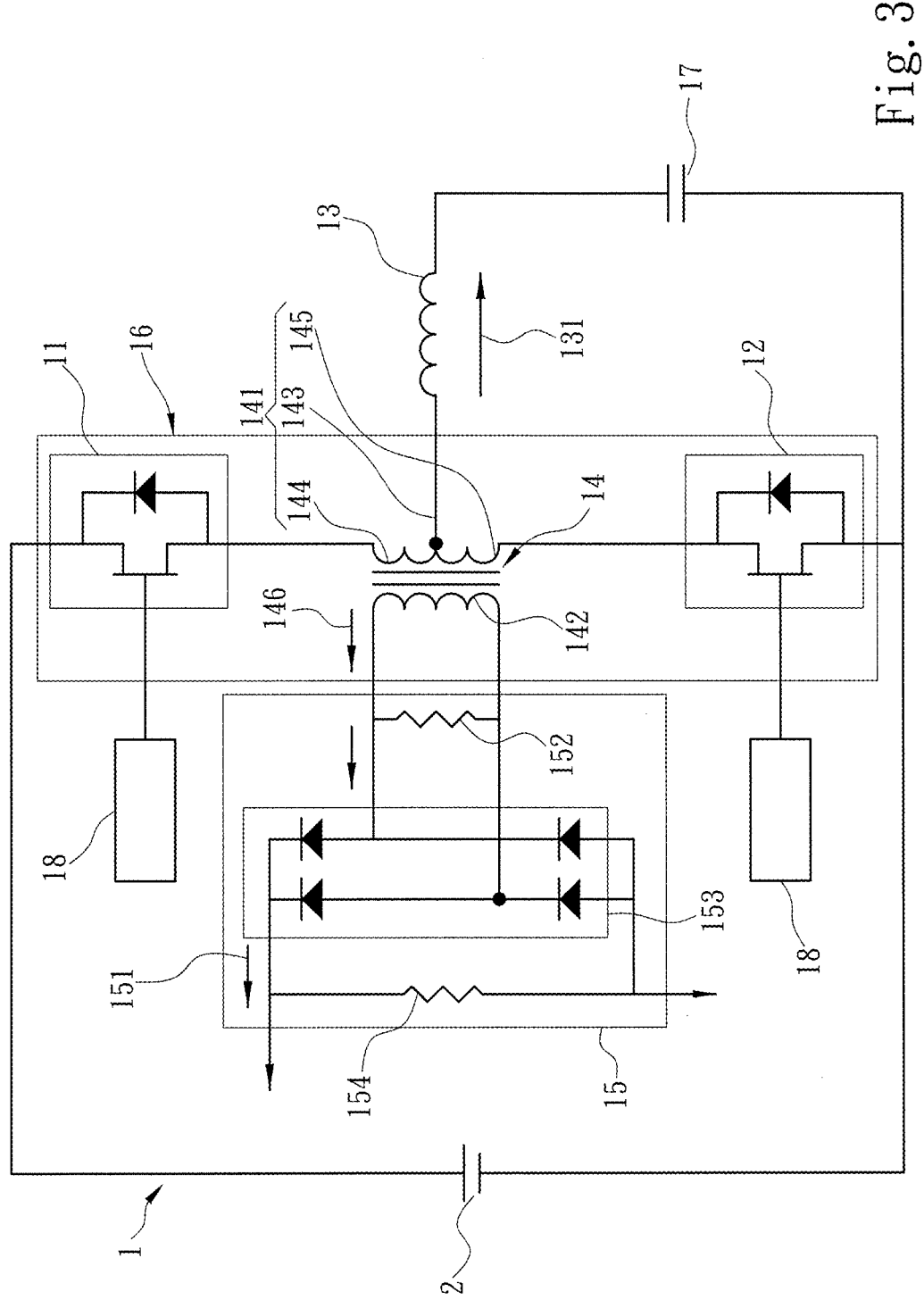
FIG. 3 is a diagram schematically showing a buck-boost power conversion circuit according to another embodiment of the present invention.

Refer to FIG. 2 and FIG. 3. The present invention provides a buck-boost power conversion circuit 1, which is connected with a power source 2, receives the electric power supplied by the power source 2, and converts the electric power into a working power. In one embodiment, the power source 2 is a direct-current power source or an alternating-current power source. While the power source 2 is an alternating-current power source, a converter must be disposed between the buck-boost power conversion circuit 1 and the alternating-current power source, converting the alternating-current working power into a direct-current working power source. The buck-boost power conversion circuit 1 comprises a first active switch 11, a second active switch 12, an inductor 13, a center-tapped current transformation element 14, and a signal rectification unit 15. The first active switch 11 is cascaded to the second active switch 12 to form a branch circuit 16. The branch circuit 16 is connected in parallel with the power source 2. The first active switch 11 may be a transistor, a metal-oxide-semiconductor field-effect transistor, or an insulated gate bipolar transistor. The second active switch 12 may also be a transistor, a metal-oxide-semiconductor field-effect transistor, or an insulated gate bipolar transistor. In the present invention, the first active switch 11 and the second active switch 12 are realized by the same type of switch elements. In other words, while the first active switch 11 is a transistor, the second active switch 12 is also a transistor. In one embodiment, the buck-boost power conversion circuit 1 further comprises an on-off control unit 18 connected with the first active switch 11 and the second active switch 12. After started, the on-off control unit 18 respectively outputs control signals to the first active switch 11 and the second active switch 12 to make the first active switch 11 and the second active switch 12 turn on or off according to the control signals. While intending to boost the power supplied by the power source 2 for feedback, the present invention inverses the pulses of the control signals to make the first active switch 11 turn on later than the second active switch 12 and then the first active switch 11 and the second active switch 12 turn on alternately, whereby the circuit of the present invention can boost the power. While intending to buck the power supplied by the power source 2, the present invention uses the pulses of the control signals to make the first active switch 11 turn on earlier than the second active switch 12 and then the first active switch 11 and the second active switch 12 turn on alternately, whereby the circuit of the present invention can buck the power.

In the present invention, the inductor 13 is connected with a capacitor 17, and the two terminals of the capacitor 17 function as the output terminals of the buck-boost power conversion circuit 1 of the present invention. In the present invention, the center-tapped current transformation element 14 includes a primary winding 141 and a secondary winding 142, wherein the turns ratio of the primary winding 141 and the secondary winding 142 are adjusted according to the requirement of application. The two terminals of the primary winding 141 are respectively connected with the first active switch 11 and the second active switch 12; the primary winding 141 includes a tapped terminal 143 connected with the inductor 13. In detail, the primary winding 141 includes a first sub-winding 144 connected with the first active switch 11 and the tapped terminal 143; and a second sub-winding 145 connected with the second active switch 12 and the tapped terminal 143. While the current is received by the primary winding 141 and flows through the primary winding 141, the secondary winding 142 is induced magnetically by the primary winding 141 to generate a magnetic induction signal 146.

Refer to FIG. 2 and FIG. 3 again. The signal rectification unit 15 is connected with the secondary winding 142, receiving the magnetic induction signal 146 from the secondary winding 142 and rectifying the magnetic induction signal 146 to generate a current sensation signal 151, which is corresponding to a current 131 of the inductor 13 and used to indicate the variation of the current 131 of the inductor 13. The signal rectification unit 15 includes a conversion resistor 152 connected in parallel with the secondary winding 142 and a rectification circuit 153 connected in parallel with the conversion resistor 152. The conversion resistor 152 modifies the characteristic of the magnetic induction signal 146 to emphasize the characteristic of the current and favor the working of the rectification circuit 153. The rectification circuit 153 may be a half-wave rectification circuit (as shown in FIG. 2) or a full-wave rectification circuit (as shown in FIG. 3). In one embodiment, the signal rectification unit 15 further includes a voltage regulation unit 154 connected in parallel with the rectification circuit 153. In one embodiment, the voltage regulation unit 154 is connected with a signal procession unit (not shown in the drawings) in the rear stage thereof. The signal procession unit receives the current sensation signal 151 and performs a preset procession on the current sensation signal 151. In one embodiment, the voltage regulation unit 154 is a voltage division circuit, undertaking a corresponding impedance matching according to the signal voltage range allowed by the signal procession unit.

In operation, the first active switch 11 and the second active switch 12 are respectively controlled by the on-off control unit 18 to turn on/off. While the first active switch 11 turns on and the second active switch turns off, the current flows through the first sub-winding 144, and the secondary winding 142 is induced magnetically by the first sub-winding 144 to generate the magnetic induction signal 146. While the first active switch 11 turns off and the second active switch 12 turns on, the current flows through the second sub-winding 145, and the secondary winding 142 is induced magnetically to generate the magnetic induction signal 146. Therefore, no matter whether the first active switch 11 or the second active switch 12 is turned on, the center-tapped current transformation element 14 can always receive the current 131 flowing to the inductor 13 to generate the magnetic induction signal 146, whereby the magnetic induction signal 146 can fully present the variation of the current 131 of the inductor 13.

Figure 4:
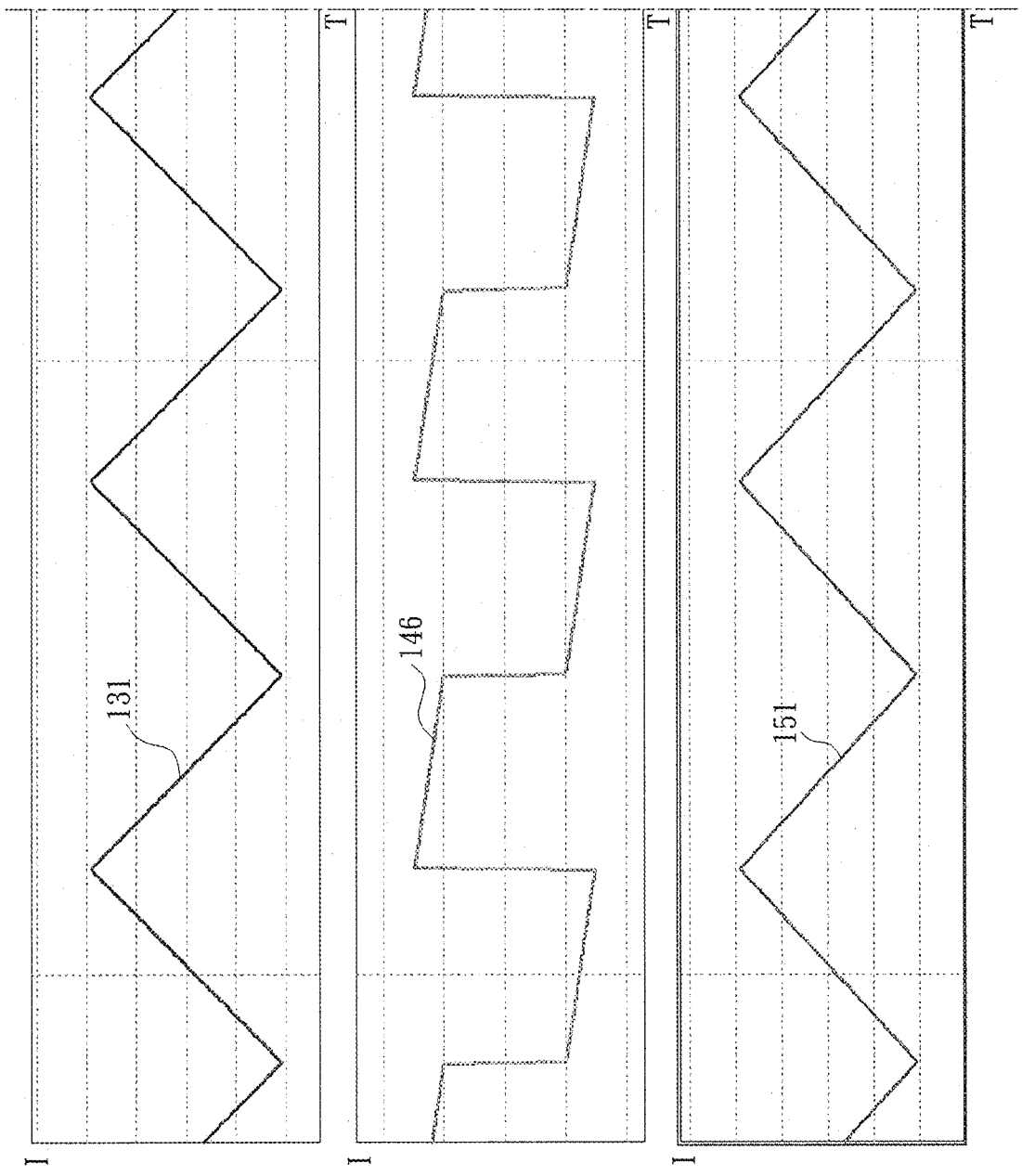
FIG. 4 is a diagram schematically showing waveforms acquired in a simulation using a continuous conduction mode (CCM) according to one embodiment of the present invention.
Figure 5:
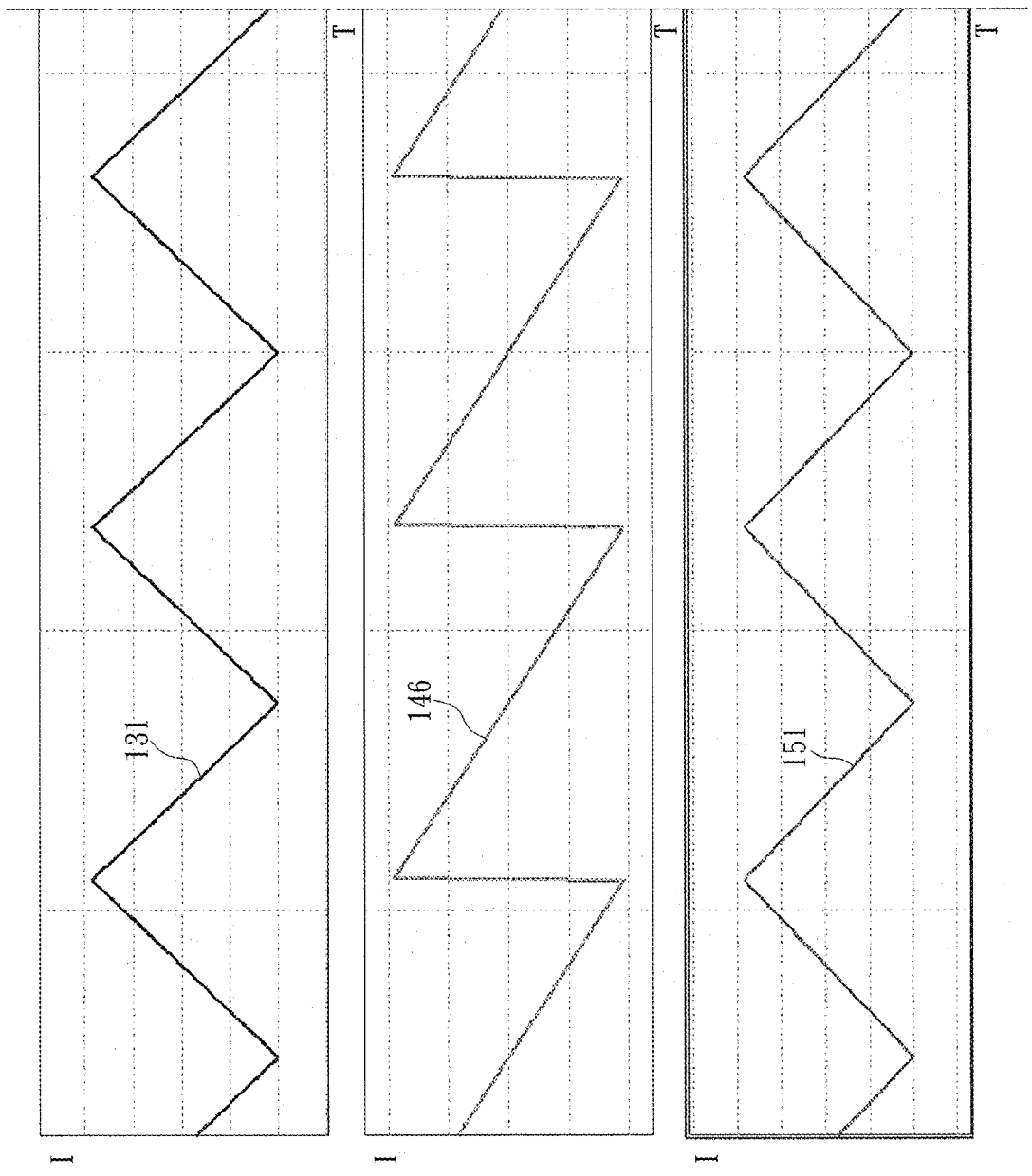
FIG. 5 is a diagram schematically showing waveforms acquired in a simulation using a critical conduction mode (CRM) according to one embodiment of the present invention.
Figure 6:
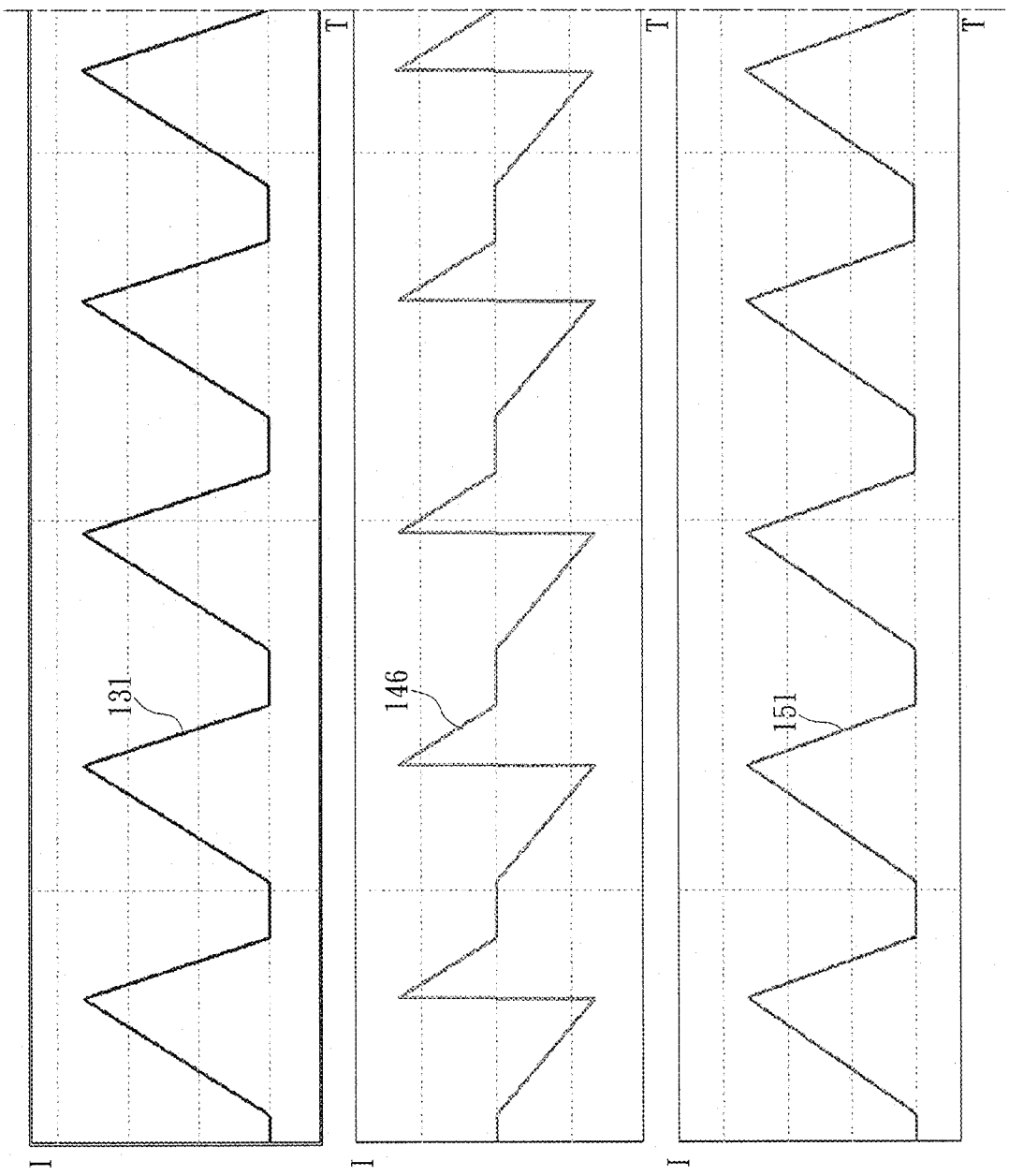
FIG. 6 is a diagram schematically showing waveforms acquired in a simulation using a discontinuous conduction mode (DCM) according to one embodiment of the present invention.

The circuit disclosed in FIG. 2 is used to simulate the present invention in a continuous conduction mode (CCM), a critical conduction mode (CRM) and a discontinuous conduction mode (DCM). The currents 131 of the inductor 13, the magnetic induction signals 146, and the current sensation signals 151, which are obtained in the three modes of simulations, are respectively shown in FIGS. 4-6. From FIGS. 4-6, it is learned that the waveform of the current sensation signal 151 is substantially the same as the waveform of the current 131 of the inductor 13. Therefore, it is proved that the structure of the present invention can indeed be used to detect the current 131 of the inductor 13.

What is claimed is:

1. A buck-boost power conversion circuit, which is connected with a power source and receives the electric power supplied by the power source, comprising
    a first active switch and a second active switch, wherein the first active switch is cascaded to the second active switch to form a branch circuit, and wherein the branch circuit is connected in parallel with the power source;
    an inductor connected with a capacitor;
    a center-tapped current transformation element including a primary winding and a secondary winding, wherein two terminals of the primary winding are respectively connected with the first active switch and the second active switch, and wherein the primary winding includes a tapped terminal connected with the inductor, and wherein while the first active switch or the second active switch is turned on, the primary winding supplies power to the inductor through the tapped terminal, and the secondary winding is induced magnetically at the same time to generate a magnetic induction signal; and a signal rectification unit connected with the secondary winding, receiving the magnetic induction signal from the secondary winding and rectifying the magnetic induction signal to generate a current sensation signal, which is corresponding to a current of the inductor.

2. The buck-boost power conversion circuit according to claim 1, wherein the center-tapped current transformation element includes a first sub-winding respectively connected with the first active switch and the tapped terminal; and a second sub-winding respectively connected with the second active switch and the tapped terminal.

3. The buck-boost power conversion circuit according to claim 1, wherein the signal rectification unit includes a conversion resistor connected in parallel with the secondary winding and a rectification circuit connected in parallel with the conversion resistor.

4. The buck-boost power conversion circuit according to claim 3, wherein the rectification circuit is a half-wave rectification circuit or a full-wave rectification circuit.

5. The buck-boost power conversion circuit according to claim 4, wherein the signal rectification unit includes a voltage regulation unit connected in parallel with the rectification circuit.

6. The buck-boost power conversion circuit according to claim 3 further comprising an on-off control unit connected with the first active switch and the second active switch.

7. The buck-boost power conversion circuit according to claim 1 further comprising an on-off control unit connected with the first active switch and the second active switch.

8. The buck-boost power conversion circuit according to claim 1, wherein the first active switch is a transistor, a metal-oxide-semiconductor field-effect transistor, or an insulated gate bipolar transistor.

9. The buck-boost power conversion circuit according to claim 1, wherein the second active switch is a transistor, a metal-oxide-semiconductor field-effect transistor, or an insulated gate bipolar transistor.

* * * * *